United States Patent [19]
Joubert et al.

[11] 4,279,766
[45] Jul. 21, 1981

[54] DETERGENT COMPOSITIONS COMPRISED OF NON-ABRASIVE SILICEOUS SCOURING AGENTS

[75] Inventors: Daniel Joubert, Trevoux; Georges Vrisakis, Collonges-Au-Mont-D'Or, both of France

[73] Assignee: Rhone-Poulenc Industries, Paris, France

[21] Appl. No.: 103,597

[22] Filed: Dec. 14, 1979

[30] Foreign Application Priority Data

Dec. 20, 1978 [FR] France ................... 78 35742

[51] Int. Cl.³ .................... C11D 3/14; C11D 3/12
[52] U.S. Cl. ................... 252/174.25; 252/99; 252/135; 252/140; 106/288 B; 423/335; 423/339
[58] Field of Search ............ 252/174.25, 99, 135, 252/140; 106/288 B; 423/339, 335

[56] References Cited

U.S. PATENT DOCUMENTS

| | | | |
|---|---|---|---|
| 3,893,840 | 7/1975 | Wason | 106/288 B |
| 4,089,795 | 5/1978 | Bailey et al. | 252/140 X |
| 4,122,025 | 10/1978 | Kiewert et al. | 252/140 X |
| 4,157,920 | 6/1979 | Wason et al. | 106/288 B |
| 4,161,455 | 7/1979 | Wason | 106/288 B |

Primary Examiner—Mayer Weinblatt
Attorney, Agent, or Firm—Burns, Doane, Swecker & Mathis

[57] ABSTRACT

Detergent compositions comprised of conventional detergent ingredients and additives include a non-abrasive silica scouring agent having a B.E.T. surface area of between 80 and 150 m²/g, and desirably a C.T.A.B. surface area below 45 m²/g and a porosity on the mercury porosimeter below 20 cm³/g.

6 Claims, No Drawings

DETERGENT COMPOSITIONS COMPRISED OF NON-ABRASIVE SILICEOUS SCOURING AGENTS

BACKGOUND OF THE INVENTION

1. Field of the Invention

The present invention relates to novel detergent compositions, and, more especially, to such compositions comprised of a unique, non-abrasive siliceous scouring agent.

2. Description of the Prior Art

It is, of course, well known to the detergent art that there exist a multitude of compositions which are considered satisfactory for the formulation of a wide variety of, e.g., dishwashing liquids.

Nonetheless, it is equally well known that in the washing of saucepans and other such utensils which have been coated with thin films of plastic, Teflon, silicone, ceramic or other release or anti-stick surfaces, repeated washing or scouring with the conventional, typically abrasive detergents immediately and continuously abrades such specialty surfaces and rapid wear necessarily results.

Thus, most often the housewife is required to manually complete the cleaning process, which is obviously contrary to an effective, unit washing operation.

One way of solving the aforementioned problem would be to modify the chemical activity of the detergent formulations. However, strict limits are necessarily placed on this approach due to the noxiousness or attendant pollution problems which could result.

SUMMARY OF THE INVENTION

Accordingly, a major object of the present invention is the provision of an improved detergent composition which enhances the mechanical activity of washing, while at the same time avoiding any prejudicial abrasion of the surfaces of the more fragile items of e.g., crockery, such as glassware.

Briefly, it has now surprisingly been determined that this double objective is achieved by including in a conventional solid detergent composition a non-abrasive scouring agent which is characterized in that it is based on an insoluble derivative of silica and has a B.E.T. surface area between 80 and 150 m$^2$/g, a C.T.A.B. surface area below 45 m$^2$/g and a porosity on the mercury porosimeter below 20 cm$^3$/g. Moreover, same advantageously has a grain size distribution characterized by an average diameter between 15 and 20μ, an oversize for the 45μ sieve of between 10 and 20% and an oversize for the 25μ sieve of 20 to 35%.

DETAILED DESCRIPTION OF THE INVENTION

More particularly, according to this invention, the subject scouring agent comprises a slightly porous, hard siliceous scouring agent which is not abrasive. It is preferably a silica such as that obtained by precipitation techniques.

The B.E.T. specific surface area is determined according to the method of Brunauer, Emmett and Teller described in the *Journal of the American Chemical Society*, Vol. 60, p.309 (February 1938). The C.T.A.B. surface area is the external surface area measured by cetyltrimethylammonium bromide absorption at pH 9, according to the method described by Jay, Janzen and G. Kraus in *Rubber Chemistry and Technology*, 44, pp. 1287-1296 (1971).

The volume of the micropores corresponds to the porosity measured on the mercury porosimeter for voids in the range 400 Å to 2.5μ.

Advantageously, a detergent composition according to the invention contains 20 to 60% of the novel scouring agent, 20 to 60% of sodium metasilicate, 15 to 30% of sodium tripolyphosphate, 0.5 to 2% of surfactant and, optionally, other conventional detergent additives such as chlorinating agents, etc. It should also be appreciated that other than the novel scouring agent consistent herewith, the remaining ingredients are conventional and well known to this art.

In order to further illustrate the present invention and the advantages thereof, the following specific examples are given, it being understood that some are intended only as illustrative and in nowise limitative.

EXAMPLE 1

In this example, a precipitated silica having the following characteristics, and prepared by the procedure outlined in Example 6 of U.S. Pat. No. 3,893,840 (except that the "finishing" pH was 4.5 rather than 5.5), was employed:

| | |
|---|---|
| B.E.T. specific surface area | 120 m$^2$/g |
| C.T.A.B. external surface area | 41 m$^2$/g |
| Volume measured on mercury porosimeter | 12.9 cm$^3$/g |
| Average diameter of particles | 15μ |
| Oversize on 25μ sieve | 26% |
| Oversize on 45μ sieve | 12% |

The effectiveness of the washing process was evaluated by means of the following test:

A stain was prepared by a non-skimmed commercial milk, 50% diluted with tap water. This milk was deposited on aluminium alloy plates which had previously been conditioned in a soda bath, followed by washing and drying. 15 g of milk were placed on the very flat duralumin plates having a size of 175×200 mm.

The stain was then fixed by drying in an oven at 120° C. for 1 hour 30 minutes. The plates were than washed in a Miele G 50 automatic dishwaster with 35 g of detergent and 15 minute washing cycle was carried out. This was followed by drying for 30 minutes at 100° C.

The effectiveness of the washing operation was evaluated by the weight ratio:

$$E \% = \frac{\text{Dirty plates} - \text{washed plates}}{\text{Dirty plates} - \text{clean plates}} \times 100$$

A detergent composition having the following formula by weight was used in all examples:

| | |
|---|---|
| Anhydrous sodium metasilicate | 40% |
| Sodium tripolyphosphate | 15% |
| Sodium carbonate | 10% |
| Silica scouring agent | 30% |
| Non-ionic surfactant (Pluronic) | 2% |
| Chlorinating agent | 3% |

(Sodium dichloroisocyanurate marketed under the trade name CDB CLEARON).

The control formulation was an identical composition, except that the silica was replaced with sodium sulfate.

In the above example, there was observed an efficiency of +2.8% compared with the control formulation.

If the silica scouring agent according to the invention is pulverized to obtain an average diameter of 5μ, its efficiency drops to virtually zero.

On retaining the same grain size distribution, but raising the B.E.T. surface area to 180 m²/g, the same absence of improvement was observed.

In addition, the abrasive power was evaluated by washing 100 times, followed by visual evaluation by photography. In this case, no abrasion was found on a soda-lime-silica glass. The abrasion was evaluated by comparison with an identical glass which had been washed 100 times with a formulation not containing a scouring agent.

For purposes of comparison, it too was found that by replacing the silica according to the invention with pulverized sand, the efficiency, when evaluated on the basis of the same criteria, was only +0.97, while manifest abrasion resulted.

A pulverized natural silica typically used as a filler for rubber and having a 7% oversize for the 25μ sieve and an average diameter between 5 and 10μ afforded a good result from the efficiency standpoint, namely, of 2.2, but same was highly unsatisfactory as regards abrasion. A silica with a B.E.T. surface area of 315 m²/g, a C.T.A.B. surface area of 46 m³/g, a porosity of 61 cm³/g and an average diameter of 7μ displayed the negative efficiency of −4.95; likewise as regards a silica with a surface area of 265 m²/g, a C.T.A.B. surface area of 100 m²/g, a porosity of 97 cm³/g and an average particle diameter of 70μ, i.e., an efficiency of −4.03.

Finally, a sodium aluminosilicate was used with a B.E.T. surface area of 101 m²/g and a porosity of 8 cm³/g, but with an external C.T.A.B. surface area of 67 m²/g and a diameter of 4.5μ. Its scouring effectiveness was substantially the same as that of sulfate, i.e., it was essentially zero.

The foregoing examples dramatically illustrate that the scouring agent according to the invention affords both a marked improvement in scouring power as well as virtual absence of abrasion.

Obviously, the limits indicated hereinbefore are not absolute, because they are established as a function of an empirical correlation between the texture and grain size parameters and the washing effectiveness is evaluated according to tests which are not strictly an accurate reflection of washing.

However, with the above reservations, it has been found that an insoluble mineral derivative such as silica provides excellent results as a scouring agent, i.e., elimination of stains and dirt without abrading the substrate bearing the said stain or dirt, provided that a given grain size distribution and morphology are strictly observed.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A detergent composition including, as a scouring agent, insoluble non-abrasive silica particles having a B.E.T. surface area between 80 and 150 m²/g, a C.T.A.B. surface area below 45 m²/g, a porosity on the mercury porosimeter below 20 cm³/g, an average particle diameter of from 15 to 20μ, an oversize between 10 and 20% on the 45μ sieve and an oversize between 20 and 35% on the 25μ sieve.

2. The detergent composition as defined by claim 1 wherein said silica particles constitute from 20 to 60% by weight of the total composition.

3. The detergent composition as defined by claim 2 wherein sodium tripolyphosphate constitutes from 15 to 30% by weight of the total composition.

4. The detergent composition as defined by claim 3 wherein sodium metasilicate constitutes from 20 to 60% by weight of the total composition.

5. The detergent composition as defined by claim 4 wherein a surfactant constitutes from 0.5 to 2% by weight of the total composition, said surfactant being conventional for use in detergent compositions.

6. A non-abrasive process for cleaning houshold utensils which comprises washing said utensils in the presence of a detergent composition as defined by claim 1, 2, 3, 4 or 5.

* * * * *